June 2, 1931.  H. B. DONLEY  1,808,024

LIQUID MEASURE

Filed Oct. 15, 1929

Inventor
H. B. Donley
By W. A. McDowell
Attorney

Patented June 2, 1931

1,808,024

UNITED STATES PATENT OFFICE

HAROLD B. DONLEY, OF COLUMBUS, OHIO, ASSIGNOR TO THE COLUMBUS AUTO BRASS COMPANY, OF COLUMBUS, OHIO, A CORPORATION OF OHIO

LIQUID MEASURE

Application filed October 15, 1929. Serial No. 399,829.

This invention relates to improvements in portable oil measures and has for its primary object the provision of a measure which is so constructed as to facilitate the lifting and use thereof by a service station attendant and wherein provision is made to permit the user to support the measure in one hand and with the use of the same hand to effect the operation of the valve mechanism in the bottom of the receptacle.

It is another object of the invention to provide an oil measure of the type referred to with an oil receiving chamber having a bottom wall in which is formed an outlet opening arranged for communication with a flexible discharge conduit or spout, the opening being controlled by a movable valve, and wherein the operating stem of the valve projects upwardly through the chamber in the front part of the measure and through the open top of the latter, the upper end of the stem being slidably received within a guide opening formed in a supporting handle which extends longitudinally across the open top of the measure, the arrangement being such that while the operator is supporting the measure by grasping the handle the operating portion of the stem will be disposed within the reach of the thumb of the operator's hand engaging the handle, so that said stem may be actuated by the hand of the operator used in supporting the vessel to control the opening and closing of the movable valve arranged on the bottom of the measure and in the interior of the latter.

It is a further object of the invention to provide the bottom of the measure with an outlet disposed laterally or eccentrically of the vertical axis of the measure and wherein the bottom is of substantially trough-shaped construction, being provided with reversely inclined walls which serve to direct the oil remaining in the bottom of the measure into the discharge conduit to insure a complete discharge of the measured contents of the vessel. This object is further attained by providing a handle for the measure which consists of a supporting portion normally arranged at an acute angle with respect to the horizontal so that when the measure is suspended from the handle during operation the angle of its supporting portion will serve automatically to cause the measure to assume an inclined position with respect to the vertical so that a positive discharge of the oil gravitationally toward the lateral outlet will be assured.

Figure 1:
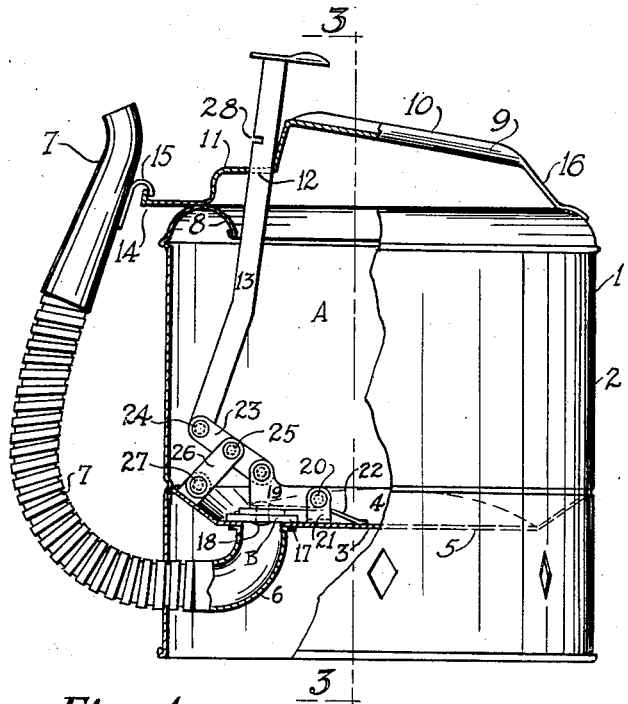
Figure 3:
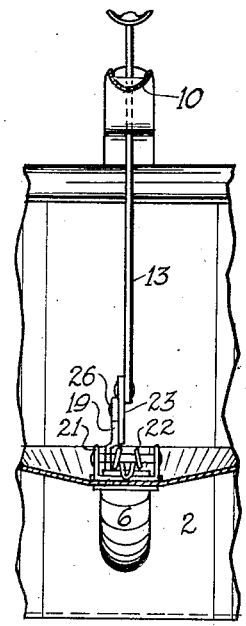
Figure 2:
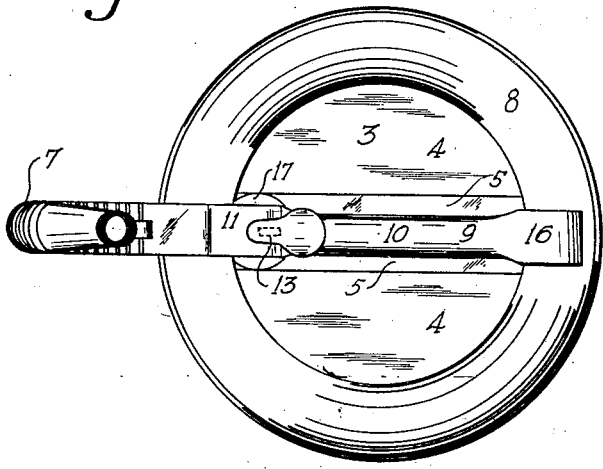

For a further understanding of the invention reference is to be had to the following description and the accompanying drawings, wherein:

Figure 1 is a vertical sectional view taken through an oil measure constructed in accordance with the present invention, the position of the measure being shown in side elevation, Figure 2 is a top plan view, and Figure 3 is a vertical cross-sectional view on the line 3—3 of Figure 1.

Referring more particularly to the drawings, the numeral 1 designates the oil measure comprising the present invention in its entirety. The measure consists of a sheet metal body 2 of substantially cylindrical form and which is formed from any suitable non-corrosive material. The interior of the body 2 is provided with a bottom 3, which is spaced from the lower edge of the body 2 and occupies a substantially horizontal plane therein, as shown in Figure 1. This bottom is of substantially trough-shaped formation in cross-section and includes reversely inclined walls or surfaces 4, which terminate in a flat substantially horizontal surface 5. Near the forward side of the measure the bottom 3 is provided with an outlet 6, which is arranged eccentrically with respect to the vertical axis of the measure. Communicating with this outlet is a flexible discharge conduit or spout 7 through which the contents of the measure are passed in order to control and direct the discharge thereof in a manner common to devices of this kind.

The upper portion of the body 2 terminates in an inwardly directed rolled flange 8 which serves to confine the liquid contents of the measure within the liquid receiving chamber A to prevent spilling thereof during handling. Arranged to extend over the open top of the measure is a supporting handle 9. This handle is struck from sheet metal and comprises a supporting portion 10 which, as shown in Figure 1, is arranged at an acute angle with respect to the horizontal. The portion 10 terminates at its forward end in an offset web 11 in which is formed a slot 12 for the slidable reception of the operating stem 13 of the valve mechanism B hereinafter described. The forward portion of the web 11 is secured to the flange 8 and the extreme forward portion of said web projects in advance of the measure and is upturned as at 14 in order to provide a shoulder for the reception of a hook 15 carried by the outer end of the conduit 7, the portions 14 and 15 serving to maintain the conduit in an elevated position when not used in a pouring operation. The lower or rear portion of the handle 9 terminates in a downwardly directed leg 16 which is secured to the opposite side of the flange 8 as regards the web 11. It will be seen that, due to the inclination of the portion 10 and the handle 9, when the measure is grasped and suspended in the hand of the operator the measure tends to tilt forward to a limited extent, and this forward tilt of the measure while supported in the hand of the operator is useful in securing complete outflow of the oil through the outlet 6.

The valve mechanism B consists in this instance of a disk 17 which normally closes the outlet 6. The disk 17 is secured as at 18 to a pivoted arm 19 which arm in turn is pivotally carried as at 20 by a bracket 21 stationarily secured to the bottom 3. A spring 22 co-operates with the arm 19 and the disk 17 to normally retain the valve disk in an outlet closing position. To raise the valve disk and its associated arm 19 against the resistance normally exerted thereon by the spring 22, the arm 19 is pivotally connected with the lower end of the link 23, the upper end of said link being pivotally connected as at 24 with the lower end of the operating stem 13. Intermediately of its length, the link 23 is pivotally connected as at 25 with a swinging link 26, the opposite and lower end of the link 26 being pivotally connected as at 27 in connection with the bottom 3.

Having thus described my invention, I will now endeavor to point out the advantages which I consider it to possess. The measure herein depicted has been designed especially for use in garages, automobile service stations and the like for the purpose of providing a vessel which will constitute both a measure and at the same time a container for transferring lubricating oil from a bulk drum or the like to the crank case of an engine. I am aware of the fact that similar measures of this character have been used holding, for example, one quart of oil or other liquid, and wherein provision is made for permitting the support of such small measures in one hand of the operator and to permit the operator with the measure supporting hand to operate the valve mechanism. The present measure, however, is designed for holding larger quantities of oil such, for example, as one gallon or other desired multiple quarts to provide for the same facility in the handling of these larger measures as has been previously secured in the construction and handling of the smaller quart measures. These advantages I attain by locating the supporting handle over the open top of the measure so that the handle extends from the front of the measure to the back thereof and normally in the vertical plane of the discharge spout. Then, in relation to this position of the handle the operating stem of the valve mechanism is located so that it projects upwardly through the forward portion of said handle where it may be engaged by the thumb of the operator's hand. By this arrangement the oil measure is well balanced when it is supported by the operator and it is not necessary to employ two hands in the operation of the measure. Then, through the provision of the lateral discharge outlet in the bottom of the container and the inclination of the supporting portion of the handle, the measure is automatically maintained during pouring so that the full contents of the chamber A will pass into the discharge conduit. This insures a customer of the complete quantity of the measured and purchased liquid. The stem 13 of the valve mechanism is engaged as at 28 so that when the stem has been depressed to a position fully opening the valve disk 17 the notch may be engaged with the walls of the web 11, thus locking the valve in its open position.

While I have shown and described the preferred embodiment of my invention, it will be understood that changes may be made in its details and construction without departing from the spirit of the invention or the scope of the appended claims.

What is claimed is:

1. In a liquid measure, a substantially cylindrical side wall, a bottom wall arranged within the confines of said side wall and disposed in a substantially horizontal plane above the lower edge of the side wall, said bottom wall being provided with an opening, a handle having its opposite ends secured to said side wall and extending across the open top of the measure, a valve mechanism for regulating the outflow of liquid through the opening in said bottom wall, and a movable operating stem for said valve mechanism arranged to project upwardly through the open top of the measure and having its upper portion slidably received in the forward part of said handle.

2. A liquid measure comprising a sheet metal body provided with an open top, a closed bottom, the bottom being spaced from the lower edge of the body, a valve mechanism arranged within said body for controlling the outflow of the liquid through a discharge opening formed in the bottom, a handle comprising a cross-bar extending across the open top of said body and having its ends secured to said body, and a stem for effecting the operation of said valve mechanism, said stem being arranged to extend adjacent to the front wall of said body and having its upper end slidably received within a guide opening formed in said bar.

3. A liquid measure comprising a body provided with an open top and a closed bottom, a valve mechanism mounted within said body for governing the outflow of liquid through an opening provided in said bottom, a handle having its opposite ends secured to said body and extending across the open top of said body, and a hand engaging portion of said handle being disposed at an acute angle with respect to the horizontal, and an operating stem for said valve means having its actuated portion terminating at the front end of and immediately contiguous to said handle.

In testimony whereof I affix my signature.

HAROLD B. DONLEY.